United States Patent [19]

Pyle et al.

[11] 4,305,174
[45] Dec. 15, 1981

[54] CONTROL SYSTEM FOR AUTOMATIC VEHICLE WASH

[75] Inventors: Clayton C. Pyle, Bloomington, Minn.; Ronald V. Plummer, Oren, Utah; Bobby R. Wigelsworth, Minnetonka, Minn.

[73] Assignee: Valley Service and Installation, Inc., Burnsville, Minn.

[21] Appl. No.: 135,522

[22] Filed: Mar. 31, 1980

[51] Int. Cl.³ .................................................. B60S 3/06
[52] U.S. Cl. ................................ 15/53 A; 15/DIG. 2
[58] Field of Search ............. 15/53 A, 53 AB, DIG. 2

[56] References Cited

U.S. PATENT DOCUMENTS

| 3,332,098 | 7/1967 | Smith | 15/53 AB |
|---|---|---|---|
| 3,456,275 | 7/1969 | Solomon | 15/53 AB |
| 3,497,894 | 3/1970 | Oldham | 15/53 AB |
| 3,593,357 | 7/1971 | Oldham | 15/53 AB |
| 3,688,328 | 9/1972 | Wilkins | 15/53 AB |
| 3,750,212 | 8/1973 | Bernardi et al. | 15/53 AB |
| 4,035,862 | 7/1977 | Ennis et al. | 15/53 AB |
| 4,039,014 | 8/1977 | Sellars | 15/53 AB |
| 4,063,327 | 12/1977 | Barber | 15/53 AB |

Primary Examiner—Edward L. Roberts
Attorney, Agent, or Firm—Kinney, Lange, Braddock, Westman and Fairbairn

[57] ABSTRACT

A "roll over" type vehicle wash apparatus includes a frame which is movable on a track and which is driven between a front end and a rear end of the track. The apparatus includes a pair of front arms and a pair of rear arms which are pivotally connected to the frame. Side wrap brushes are rotatably connected to each of the front and rear arms and are rotated about vertical axes. A control circuit for automatically controlling operation of the apparatus includes five sequence control relays, FRONT IN and REAR IN switches for sensing side wrap brush position, a TOP BRUSH DOWN switch for sensing top brush position, and a HOME TRAVEL switch for sensing frame position on the track. The control circuit prevents both the front and rear arms from being fully in at the same time, thereby preventing a dangerous condition from occurring when very short vehicles are being washed.

26 Claims, 10 Drawing Figures

CONTROL SYSTEM FOR AUTOMATIC VEHICLE WASH

REFERENCE TO CO-PENDING APPLICATION

Reference is made to a co-pending application entitled "Vehicle Wash Equipment", Ser. No. 135,918, filed on even date with this application and assigned to the same assignee as the present application.

BACKGROUND OF THE INVENTION

1. Field of the Invention

The present invention relates to automatic vehicle washing equipment.

2. Description of the Prior Art

Many types of automated vehicle washing equipment have been developed for washing cars and trucks. The two most widely used types of equipment at this time are the "drive through" type and the "roll over" type.

In the "drive through" type of apparatus, the washing mechanism is in a fixed position and the automobile or other vehicle is driven or propelled through the washing mechanism at a predetermined speed. In this type of apparatus, the vehicle enters at one end of the car wash and exits at the other end after washing has been completed.

The "roll over" type of vehicle washing apparatus includes a movable frame which carries the washing brushes, water and soap supplies, and the like. In this type of apparatus, the vehicle is parked and the movable frame moves over the vehicle to wash it.

SUMMARY OF THE INVENTION

The present invention is a roll over type vehicle washing apparatus in which a movable frame is driven along a track between a front end and a rear end of the track. Pivotally connected to the frame are first and second front arms and first and second rear arms. The first and second front side wrap brushes are rotatably connected to the first and second front arms respectively. Similarly, the first and second rear side wrap brushes are rotatably connected to the first and second rear arms, respectively.

The present invention includes means for sensing arm position and control means for controlling the actuator means. The control means causes the actuator means to retract the rear arm means when the front arm means moves to a first predetermined position at the front end of the vehicle. Similarly, the control means causes the actuator means to retract the front arm means when the rear arm means move to a second predetermined position at the rear end of the vehicle. In this way, the present invention prevents a dangerous condition from occurring in which the front arm means and the rear arm means surround the vehicle, thereby preventing relative motion between the frame means and the vehicle.

In another embodiment, the roll-over type vehicle wash apparatus includes top brush support means which is pivotally connected to the frame means. Top brush means is rotatably connected to the top brush support means, and is rotated by top brush drive means. First, second and third switch means are provided for sensing position in the front arms, the rear arms, and the top brush support means, respectively. The control means controls the operation of the apparatus as a function of the states of the first, second and third switch means.

DETAILED DESCRIPTION OF THE PREFERRED EMBODIMENTS

Figure 1:
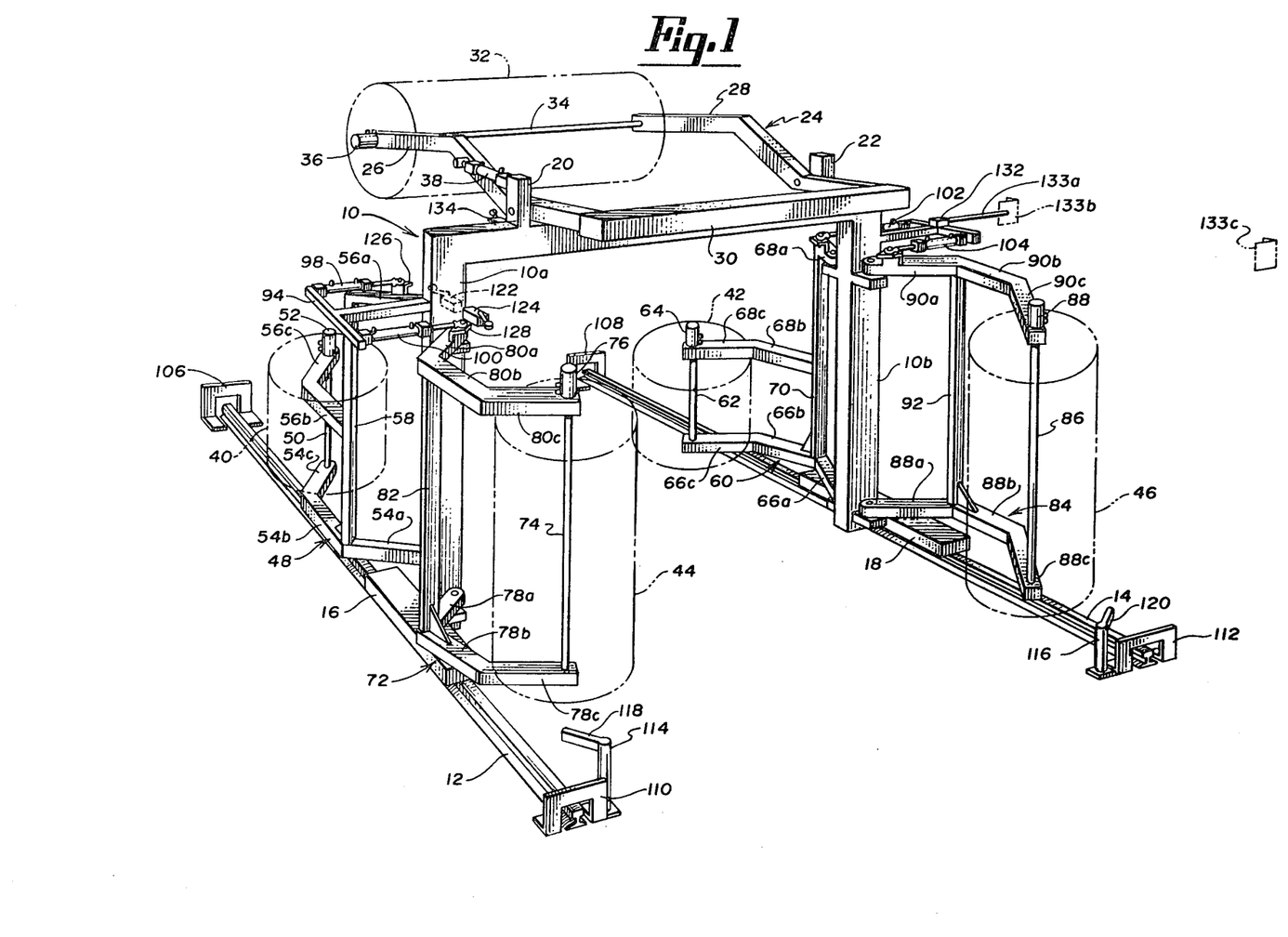
FIG. 1 is a perspective view of the car wash apparatus of the present invention viewed generally from the rear of the apparatus and with the top and side wrap brushes shown in phantom.
Figure 2:
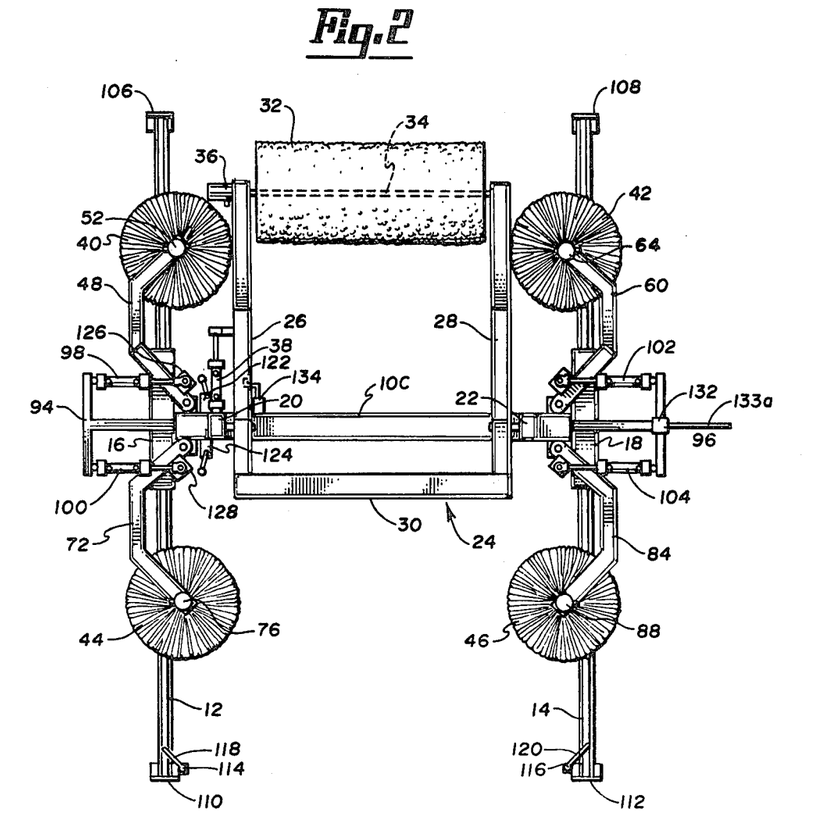
FIG. 2 is a top plan view of the car wash apparatus of the present invention.

FIGS. 1 and 2 show the car wash equipment of the present invention, which is of the "roll-over type". As shown in FIGS. 1 and 2, the equipment includes frame 10, which is movable back and forth on parallel rails 12 and 14. Frame 10 includes left and right vertical members 10a and 10b and horizontal top member 10c, which extends between the top ends of vertical frame members 10a and 10b. Attached to the bottom ends of vertical frame members 10a and 10b are bases 16 and 18, which roll on rails 12 and 14, respectively. The entire apparatus is driven back and forth automatically on rails 12 and 14 by a motor drive (not shown) of a conventional type used in roll-over car wash equipment.

Connected to the top member 10c of frame 10 are two upstanding members 20 and 22. Top brush support 24 is pivotally connected to members 20 and 22, and includes arms 26 and 28 and counterweight cross bar 30. Top brush 32 is supported and rotates about the axis of shaft 34. Hydraulic motor 36 drives shaft 34 to rotate top brush 32.

The position of top brush 32 is controlled by hydraulic actuator 38 which has one end pivotally connected to upstanding member 20, and its opposite end pivotally connected to arm 26. Actuator 38 is a double acting hydraulic actuator which raises and lowers brush 32 by pivoting arms 26 and 28 upward or downward, respectively. Counterweight cross bar 30 has a weight which normally biases roller 30 to its uppermost position, and actuator 38 drives roller 30 downward during operation of the vehicle wash equipment.

In addition to top brush 32, the vehicle wash apparatus shown in FIGS. 1 and 2 has four side wrap brushes: left and right front side wrap brushes 40 and 42, and left and right rear side wrap brushes 44 and 46. Rear brushes 44 and 46 are taller than front brushes 40 and 42 because they are used to wash the back ends of vans and trucks.

Each of the four side wrap brushes is supported by an arm assembly which is pivotally connected to frame 10. The left front arm assembly 48 is pivotally connected to left vertical frame member 10a and is rotatable about a vertical pivot axis. Brush 40 is mounted at the free end of arm assembly 48 and is rotatably about vertical shaft 50. Hydraulic motor 52 drives shaft 50 and brush 40.

As shown in FIG. 1, arm assembly 48 includes a lower arm formed by members 54a, 54b and 54c, and an upper arm formed by members 56a, 56b and 56c and a vertical support member 58. Members 54a and 56a are pivotally connected to left vertical frame member 10a, and shaft 50 and motor 52 are mounted on members 54c and 56c at the opposite ends of arm assembly 48. The upper and lower arms form, when viewed from a top view (FIG. 2), a generally C-shaped configuration.

Right from arm assembly 60 is a mirror image of left front arm assembly 48. Arm assembly 60 is pivotally connected to right vertical frame member 10b, and has a vertical shaft 62 and a hydraulic drive motor 64 mounted at the free ends of arm assembly 70 to rotate brush 42. Arm assembly 60 includes a lower arm formed by members 66a, 66b and 66c, and upper arm formed by micromembers 68a, 68b and 68c, and a vertical support member 70.

Left rear arm assembly 72 is pivotally connected to left vertical frame member 10a, and brush 44 is rotatably mounted on shaft 74 which is supported at the free end of arm assembly 72. Hydraulic motor 76 drives shaft 74 and brush 44. Arm assembly 72 includes a lower arm formed by members 78a, 78b and 78c, an upper arm formed by members 80a, 80b and 80c, and a vertical member 82 which extends between the upper and lower arms.

Right rear arm assembly 84 is a mirror image of left rear arm assembly 72, and is pivotally connected to right vertical frame member 10b. Brush 46 is rotated on vertical shaft 86, which is supported at the free end of arm assembly 84 and is driven by hydraulic motor 88. Arm assembly 84 includes a lower arm formed by members 88a, 88b and 88c, an upper arm formed by members 90a, 90b and 90c, and a vertical member 92 which extends between the upper and lower arms. As with front arm assemblies 48 and 60, rear assemblies 72 and 84 have generally C-shaped configurations when viewed from the top, as in FIG. 2.

Connected to left vertical frame member 10b is a T-shaped member 94. Similarly, T-shaped member 96 is connected to right vertical frame member 10b. Hydraulic actuators 98 and 100 are connected between T member 94 and left arm assemblies 48 and 72, respectively. Actuators 98 and 100 are double-acting hyraulic cylinders which control the position of arm assemblies 48 and 72. Similarly, hydraulic actuators 102 and 104 are connected between the ends of T member 96 and right arm assemblies 60 and 84. Actuators 102 and 104 are double-acting hydraulic cylinders which control the positions of right arm assemblies 68 and 84.

Positioned at the front ends of rails 12 and 14 are upstanding stop members 106 and 108, respectively. Stop members 106 and 108 limit the forward movement of frame 10 and the attached brushes and arm assembly by engaging the front ends of movable bases 16 and 18. As best shown in FIG. 2, top brush support 24 and top brush 32 extend forward of front arms 48 and 60. Stop members 106 and 108 are positioned to engage the front ends of movable bases 16 and 18 before brush 32 can touch the front door (not shown) of the bay. In this way front arms 48 and 60 can never reach the front door, even if the front arms are not folded in.

Upstanding stop members 110 and 112 are positioned at the rear ends of rails 12 and 14, respectively, and limit the rearward movement of the apparatus on rails 12 and 14. Positioned adjacent stop members 110 and 112 are upstanding posts 114 and 116 to which are attached deflector members 118 and 120, respectively. Posts 114 and 116 and deflector members 118 and 120 engage the lower arms of the rear arm assemblies 72 and 84 and force the arms inward as the apparatus approaches rear stops 110 and 112. The cooperation of posts 114 and 116 and deflectors 118 and 120 with arm assemblies 72 and 84 prevents damage to doors or other structures which are located near the rear end of the rails 12 and 14. In the present invention, in the event a failure of actuators 102 or 104, or a system malfunction, the arms will be automatically forced in by posts 114 and 116 and deflectors 118 and 120.

Also shown in FIGS. 1 and 2 are "FRONT IN" and "REAR IN" arm position sensing microswitches 122 and 124, which sense the position of front arm assembly 48 and rear arm assembly 72, respectively. Microswitches 122 and 124 each have an actuator end which engages mounting brackets 126 and 128, respectively, on arm assemblies 48 and 72. Mounting brackets 126 and 128 pivotally connect one end of actuators 98 and 100 to the arm assemblies. As the arms are pivoted inward, bracket 126 or 128 finally triggers limit switch 122 or 124, thereby indicating that the arm has been folded in to near its innermost position. The signals from FRONT IN and REAR IN switches 122 and 124 are used to prevent both the front and rear arms from being driven inward at the same time. This can be a dangerous condition when very short subcompact cars are being washed. When a signal from FRONT IN switch 122 is received, rear arms 72 and 84 are driven outward to a retracted position. Similarly, when a signal is received from REAR IN switch 124 the front arms 48 and 60 are driven outward to a retracted position.

In addition to FRONT IN and REAR IN switches 122 and 124, the apparatus of the present invention also includes two other switches which provide signals for controlling operation. HOME TRAVEL switch 132 is mounted on T member 96, and has a feeler arm which engages location indicating tabs 133b and 133c (shown in phantom in FIG. 1). Tab 133b indicates the "home" position of frame 10, while tab 133c indicates that frame 10 has reached its rear limit of travel. TOP BRUSH DOWN switch 134 senses the position of top brush support 24, and thus the position of top brush 32.

Figures 3A, 3B, 3C, 3D, 3E:
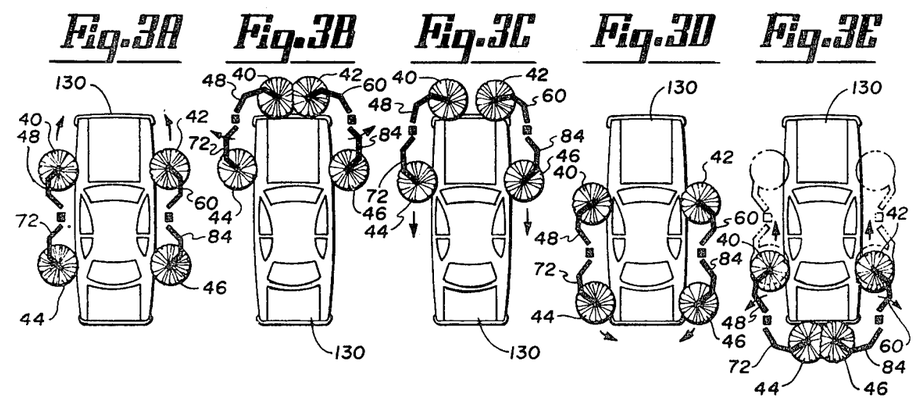
FIGS. 3A-3E are sequential illustrations of the apparatus of FIGS. 1 and 2 illustrating operation from start to finish of a washing cycle.

FIGS. 3A–3E illustrate the normal automatic operation of the side wrap brushes in the vehicle wash apparatus of the present invention. As shown in FIG. 3A, a vehicle 130 is driven into position and is stopped with the center of the car wash apparatus located slightly forward of the center of vehicle 130. As operation of the apparatus commences, actuators 98, 100, 102 and 104 (shown in FIGS. 1 and 2) swing arms 48, 60, 72 and 84 inward until brushes 40, 42, 44 and 46 are in contact with the sides of the vehicle 130. Frame 10 is driven along rails 12 and 14 toward the front end of vehicle 130 and the front end of rails 12 and 14. As the apparatus reaches the front end of vehicle 130, as shown in FIG. 3B, arms 48 and 60 begin to pivot inward to maintain brushes 40 and 42 in contact with the front surfaces of vehicle 130. When arms 48 and 60 have pivoted in sufficiently that FRONT IN switch 122 is actuated, arms 72 and 84 are automatically driven outward to a recessed position, as illustrated by the curved arrows in FIG. 3B.

As shown in FIG. 3B, the direction of movement of frame 10 then reverses and frame 10 begins to move toward the rear end of vehicle 130 and rails 12 and 14. As front arms 48 and 60 begin to separate, FRONT IN switch 122 returns to its original state, and rear arms 72 and 84 are permitted to swing back toward vehicle 130 thereby bringing rear brushes 44 and 46 into contact with the sides of vehicle 130.

FIG. 3D shows the vehicle wash apparatus as it is approaching the rear end of vehicle 130. As shown in FIG. 3D, all four side wrap brushes are in contact with the sides of vehicle 130. In FIG. 3E, arms 72 and 84 are driven inward to maintain brushes 44 and 46 in contact with the rear end of vehicle 130. When REAR IN switch 124 changes state as a result of arm 72 being driven inward, front arms 48 and 60 are automatically retracted as illustrated by the curved arrows in FIG. 3E.

The direction of movement of frame 10 is again reversed so that the frame 10 begins moving toward the front of the vehicle 130. This forward movement of frame 10 continues until frame 10 has returned to the original starting position, as illustrated in phantom in FIG. 3E.

Figure 4:
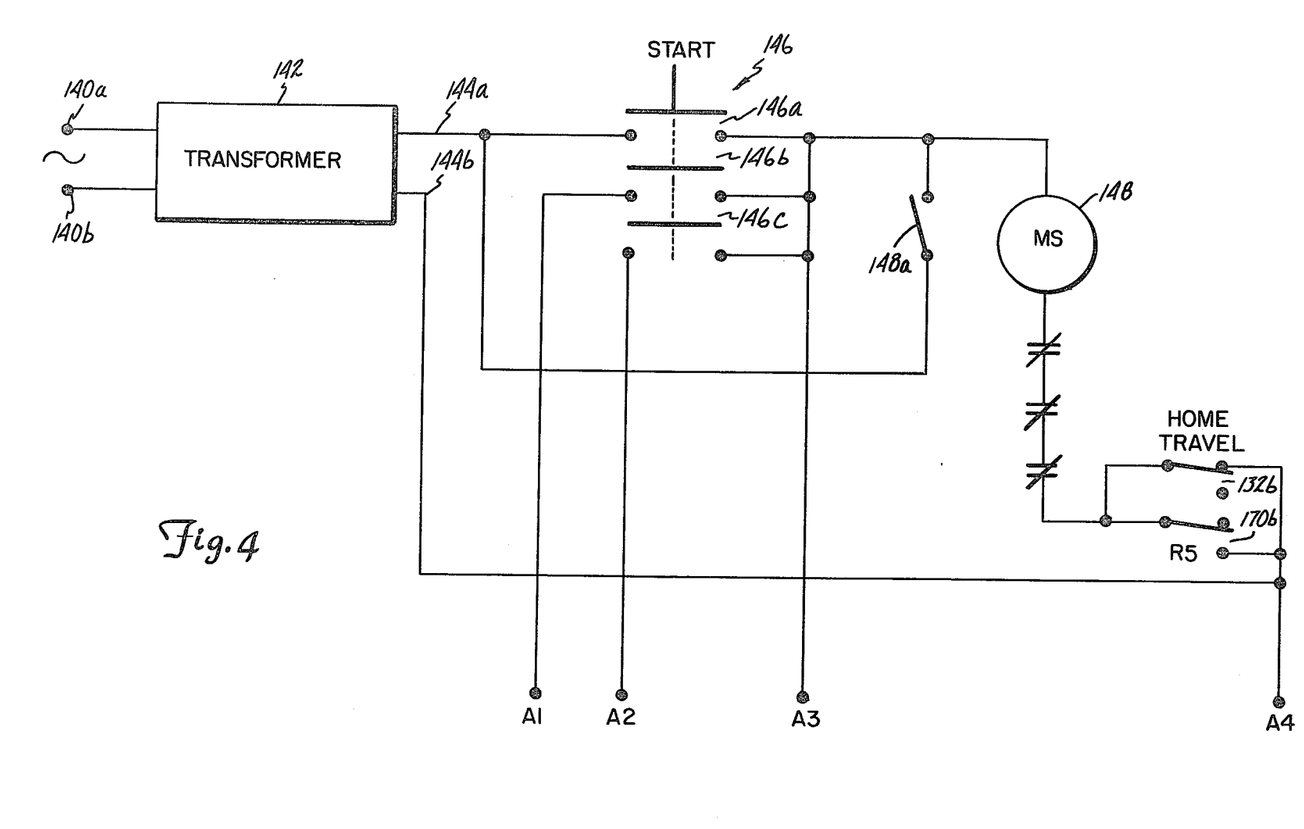
FIGS. 4-6 are electrical schematic diagrams of the electrical control circuitry of the vehicle wash of the present invention.
Figure 5:
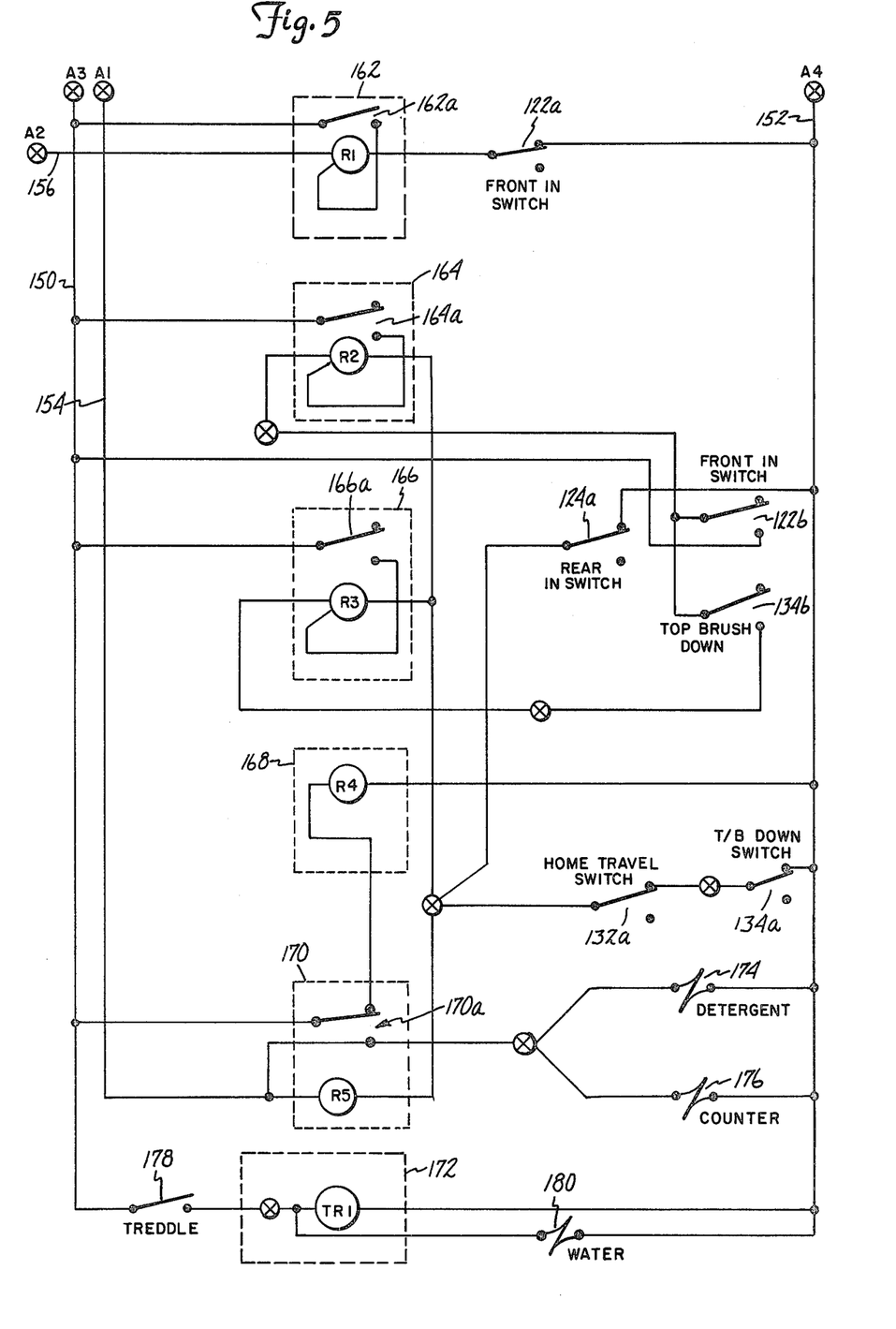
Figure 6:
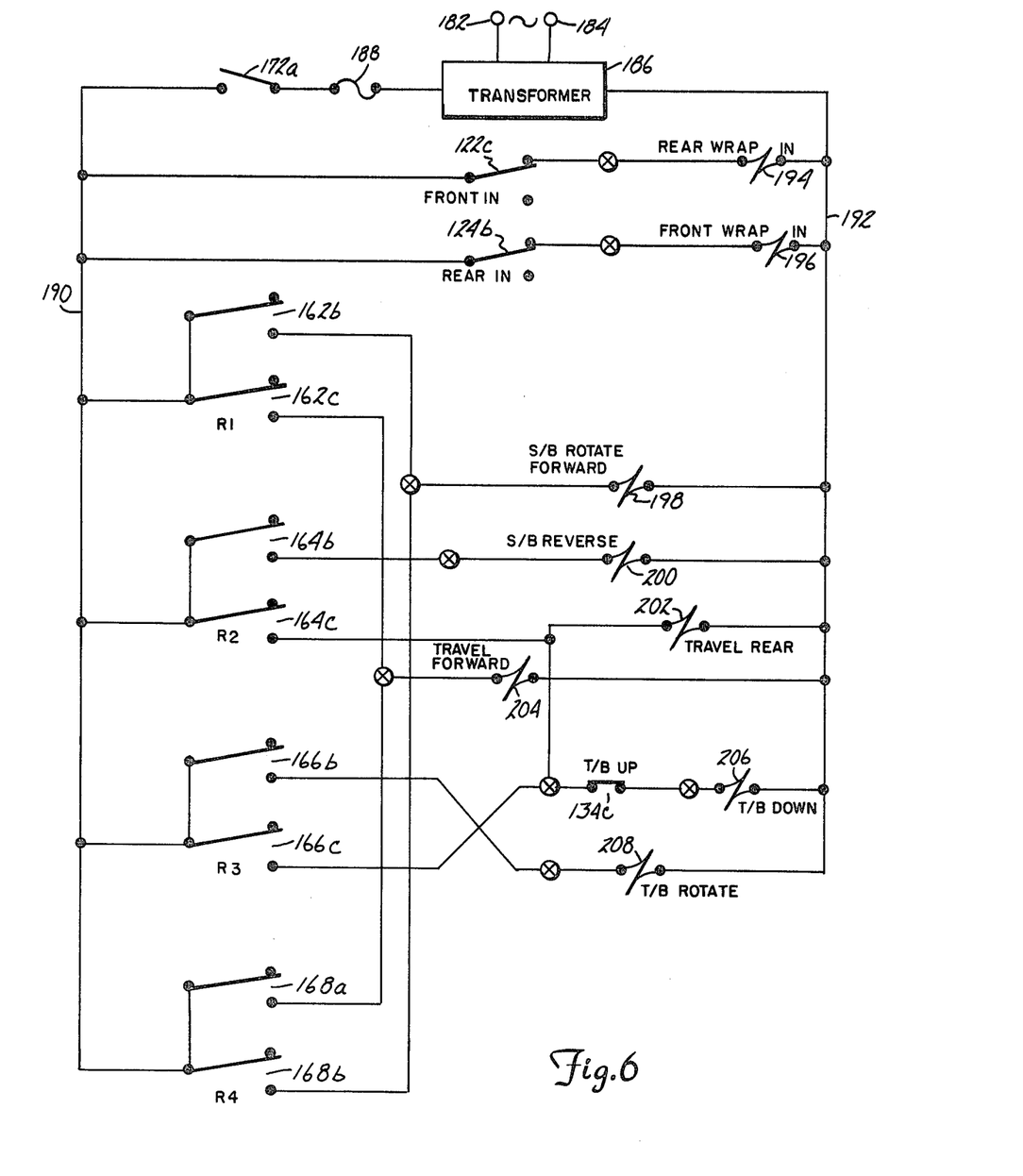

FIGS. 4, 5 and 6 are an electrical schematic diagram of the electrical control circuitry of the vehicle wash equipment of the present invention.

FIG. 4 shows a start circuit of the electrical control circuitry. Power for the circuit is supplied at terminals 140a and 140b of transformer 142, which steps down the input AC voltage to a 24 volt AC signal at output terminals 144a and 144b. START switch 146 initiates operation of the car wash apparatus. As shown in FIG. 4, START switch 146 has three sets of contacts 146a, 146b and 146c which are normally open, but which are closed temporarily when operation of the car wash is initiated.

The start circuit shown in FIG. 4 has four output terminals A1, A2, A3 and A4. When START switch 146 is actuated, output terminals A1 and A2 are temporarily energized. In addition, when relay coil R5 (FIG. 5) is energized, it closes contacts 170b, which permits motor start relay coil 148 to be energized through START switch 146. Coil 148 closes holding contacts 148a, which hold motor start relay coil 148 on after START switch 146 is released. In addition to closing contacts 148a, motor start relay coil 148 controls contacts which energize a motor (not shown) which drives the hydraulic pump for the hydraulic system of the vehicle wash equipment. Once motor start relay coil 148 is turned on, so that holding contacts 148a remain closed, continuous energy is provided at terminals A3 and A4.

The control circuit of FIG. 5 receives power from terminals A1-A4. The circuit of FIG. 5 includes first and second main conductors 150 and 152, which are connected to terminals A3 and A4, respectively. Conductor 154 is connected to temporarily energized terminal A1 and conductor 156 connected to temporarily energized terminal A2.

The control circuit of FIG. 5 includes first relay 162, second relay 164, third relay 166, fourth relay 168, fifth relay 170 and time delay relay 172. First relay 162 includes relay coil R1 and normally open contacts 162a (shown in FIG. 5), 162b and 162c (shown in FIG. 6). Similarly, second relay 164 includes a relay coil R2 and normally open contacts 164a, 164b and 164c. Third relay 166 includes relay coil R3 and normally open contracts 166a, 166b, and 166c, Fourth relay 168 includes relay coil R4 and normally open contacts 168a, 168b and 168c. Fifth relay 170 includes relay coil R5 and contracts 170a and 170b (FIG. 4). Time delay relay 172 includes relay coil TR1 (FIG. 5) and normally open contact 172a (FIG. 6).

Relay coil R1 and contacts 162a are connected in a series current path between main conductors 150 and 152. Also connected in series with relay coil R1 are normally open contact 122a of FRONT IN switch 122. Relay coil R1 also has a terminal connected by conductor 156 to terminal A2. When START switch 146 (FIG. 4) is initially actuated, it provides temporary energization of relay coil R1 through terminal A2. As soon as relay coil R1 is energized, it closes contacts 162a, thereby completing the current path from conductor 150 to conductor 152 and thereby holding relay R1 in an energized state until contacts 122a of FRONT IN switch 122 are opened.

Relay coil R2 and contacts 164a are connected in current paths between conductor 150 and conductor 152. Relay coil R2 is connected in a series current path from conductor 150 through normally open contacts 122b of FRONT IN switch 122, through coil R2, and then through two parallel current paths to conductor 152. The first current path is through normally closed contacts 124a of REAR IN switch 124. The second parallel current path is through normally closed contacts 132a of HOME TRAVEL switch 132 and normally closed contacts 134a of TOP BRUSH DOWN switch 134. Once relay coil R2 is energized, contacts 164a remain closed, thereby holding relay coil R2 on.

Relay coil R3 is initially energized through a current path from conductor 150, through contacts 134b of TOP BRUSH DOWN switch 134, and then through the current path including contacts 124a of REAR IN switch 124 to conductor 152. Once relay coil R3 is energized, normally open contacts 166a are closed, thereby holding relay coil R3 on and providing energization from conductor 150.

Relay coil R4 of relay 168 is connected in series with normally closed contacts 170a of fifth relay 170 between conductors 150 and 152. Relay coil R4, therefore, is de-energized when relay coil R5 is energized, and becomes energized when R5 is de-energized.

Relay coil R5 is connected in a current path between conductor 154 and conductor 152. The current path includes coil R5 and either the current path including contacts 124a of REAR IN switch 124, or the current path including contacts 132a of HOME TRAVEL switch 132 and contacts 134a of TOP BRUSH DOWN switch 134.

In addition to controlling relay coil R4 of relay 168, contacts 170a of relay 170 also control detergent solenoid valve 174 and counter solenoid valve 176. Solenoid valves 174 and 176 are connected in parallel between conductor 152 and the normally open terminal of contacts 170a.

Contacts 170a also act as holding contacts to hold on relay coil R5 once it is initially energized. Contacts 170a connect one terminal of relay coil R5 to main conductor 150.

Contacts 170b (FIG. 4) are connected in series with motor starter relay coil 148. When START swithch 146 is actuated, terminal A1 is temporarily energized, thereby energizing relay coil R5 and closing contacts 170b. This permits motor starter relay 148 to be energized to provide constant power to terminals A3 and A4. Contacts 170b control motor starter relay coil 148 because HOME TRAVEL switch contacts 132b are open at the commencement of operation.

Treadle switch 178 is a normally open switch which is closed when a vehicle is in position in the vehicle wash apparatus. The weight of the car wheel holds treadle switch 178 closed. Relay coil TR1 of time delay relay 172 is connected in series with treadle switch 178 between conductors 150 and 152. Water solenoid valve 180 is connected in parallel with coil TR1 and also is energized by the closing of treadle switch 178.

The circuit shown in FIG. 5 provides the switching necessary for sequencing of the operation of the vehicle wash apparatus. In addition, it controls the operation of the chemical system through detergent solenoid valve 174 and water solenoid valve 180.

Movement of the car wash apparatus and operation of the brushes is controlled by the load circuit shown in FIG. 6. AC electrical power to this circuit is supplied at terminals 182 and 184 and is stepped down by transformer 186. One output terminal of transformer 186 is connected through fuse 188 and contacts 172a of time delay relay 170 to main conductor 190. The other terminal of transformer 186 is connected to main conductor 192.

The load circuit of FIG. 6 includes REAR WRAP IN solenoid valve 194, which controls operation of hydraulic actuators 100 and 104 as shown in FIGS. 1 and 2. REAR WRAP IN solenoid valve 194 is connected in series with contacts 122c of FRONT IN switch 122.

FRONT WRAP IN solenoid valve 196 controls operation of actuators 98 and 102 shown in FIGS. 1 and 2. Contacts 124b of REAR IN switch 124 are connected in series with FRONT WRAP IN solenoid valve 196.

SIDE BRUSH ROTATE FORWARD valve 198 and SIDE BRUSH ROTATE REVERSE valve 200 control the direction of rotation of the side brushes by controlling the operation of hydraulic motors 52, 64, 76 and 88 (FIGS. 1 and 2). SIDE BRUSH ROTATE FORWARD valve 198 is actuated by closing of either contacts 162b of first relay 162 or contacts 168b of fourth relay 168. SIDE BRUSH ROTATE REVERSE valve 200 is energized by closing of contacts 164b of second relay 164. TRAVEL REAR solenoid valve 202 and TRAVEL FORWARD solenoid valve 204 control the hydraulic drive (not shown) which drives frame 10 on rails 12 and 14. When TRAVEL REAR solenoid valve 202 is energized, the frame 10 moves toward the rear end of the track, and when TRAVEL FORWARD solenoid valve 204 is energized, frame 10 moves toward the forward end of the track. TRAVEL REAR solenoid valve 202 is energized by closing of either contacts 164c of second relay 164, or contacts 166c of third relay 166. TRAVEL FORWARD solenoid valve 204 is energized by closing of either contacts 162c of first relay 162, contacts 168a of fourth relay 168.

TOP BRUSH DOWN solenoid valve 206 controls operation of hydraulic actuator 38 (FIGS. 1 and 2), and TOP BRUSH ROTATE solenoid valve 208 controls operation of hydraulic motor 36 (FIGS. 1 and 2). TOP BRUSH DOWN solenoid 206 is energized by closing of either contacts 164c of second relay 164, or contacts 166c of third relay 166. In addition, normally closed contacts 134b of TOP BRUSH DOWN switch 134 are connected in series with TOP BRUSH DOWN solenoid valve 206. TOP BRUSH ROTATE solenoid valve 208 is energized by closing of contacts 166b of third relay 166.

The operation of the circuitry of FIGS. 4–6, and thus the operation of the vehicle wash apparatus is initiated by START switch 146. Start relay 150 temporarily energizes terminals A1–A3. As soon as relay coil R5 is energized, it closes contacts 170b, thereby permitting motor starter relay 148 to be energized, closing contacts 148a and providing continuous power between terminals A3 and A4. In addition, motor starter 148 starts a motor (not shown) which drives a pump for the hydraulic system.

Assuming the vehicle is in position in the apparatus, treadle switch 178 is closed, which energizes coil TR1 of time delay relay 172. If treadle switch 178 remains closed for the time delay of relay 172, contacts 172a are closed, thereby providing power to conductors 190 and 192 of the load circuit (FIG. 6). Water solenoid valve 180 is also immediately energized provided treadle switch 178 is closed. If treadle switch 178 is not closed, or if it opens because the car is not stopped in position, contacts 172a of time delay vehicle 172 will prevent power to be supplied between conductors 190 and 192, and thus the apparatus will not commence operation.

The temporary energization of terminals A1 and A2 causes first relay coil R1 (as well as fifth relay coil R5) to be immediately energized. First relay coil R1 is held on, after initial energization, by contacts 162a, and will remain on until contacts 122a of FRONT IN switch 122 open. Energization of relay coil R1 causes contacts 162b and 162c to close. This energizes the SIDE BRUSH ROTATE FORWARD solenoid valve 198 and TRAVEL FORWARD solenoid valve 204. In addition, REAR WRAP IN solenoid valve 196 and FRONT WRAP IN solenoid valve 198 are initially energized.

The energization of coil R5 causes contacts 170a to switch, thereby preventing energization of coil R4 and energizing DETERGENT solenoid valve 174 and COUNTER solenoid valve 176.

As frame 10 begins to move forward, feeler arm 133a moves out of contact with tab 133b. As a result, HOME TRAVEL switch 132 returns to its normal state, with contacts 132a and 132b closed.

During the first phase of operation, therefore, front and rear side wrap brushes 40, 42, 44 and 46 are driven into contact with the sides of the vehicle, frame 10 is driven forward, and the detergent and water are sprayed on the vehicle. The first phase of operation is shown in FIG. 3A.

The forward travel of frame 10 continues until front side wrap brushes 40 and 42 are driven in, as illustrated in FIG. 3B. This causes FRONT IN switch 122 to change state, thereby opening contacts 122a and 122c and closing contacts 122b. The opening of contacts 122a de-energizes coil R1. The de-energizing of coil R1 opens contacts 162b and 162c, thereby de-energizing SIDE BRUSH ROTATE FORWARD valve 198 and TRAVEL FORWARD valve 204.

The opening of contacts 122c de-energizes REAR WRAP IN solenoid 194. As a result, when the front wrap brushes are in, REAR WRAP IN solenoid valve 194 is de-energized, thereby retracting the rear wrap brushes. This prevents a dangerous condition from occurring, in which both the front and rear wrap brushes are in at the same time.

The closing of contacts 122b energizes coil R2. Once coil R2 is energized, it is held in an energized state by holding contacts 164a. The closing of contacts 164b and 164c of second relay 164 energize SIDE BRUSH REVERSE solenoid valve 200 and the TRAVEL REAR solenoid valve 202. In addition, the closing of contacts 164c energizes TOP BRUSH DOWN solenoid valve 206.

Frame 10 then begins to be driven toward the rear, and top brush 32 is driven downward by actuator 38 into contact with the vehicle. When frame 10 has moved rearward about two feet, and top brush 32 has come down, the position of the top brush is sensed by TOP BRUSH DOWN switch 134, which changes state, thereby opening contacts 134a and 134c and closing contacts 134b. Coil R3 is energized through contacts 134b and contacts 124a of REAR WRAP IN switch 124. Once energized, R3 is held in an energized state by holding contacts 166a.

The energizing of third relay coil R1 closes contacts 166b and 166c. This causes TOP BRUSH ROTATE valve 208 to be energized.

Coils R2 and R3 remain energized as the frame 10 is driven rearward. As the rearward travel of frame 10 continues, FRONT IN switch 122 again changes state, since the front wrap brushes are separated as they follow the contour of the vehicle. With this change in state, relay contacts 122c again close, thereby energizing REAR WRAP IN solenoid valve 194. This drives the rear wrap brushes back into contact with the vehicle.

Similarly, as frame 10 moves rearward, the top brush follows the contour of the vehicle. As the brush rises, TOP BRUSH DOWN switch 134 changes state, thereby closing contacts 134c. Since both contacts 164c and 166c are closed, TOP BRUSH DOWN solenoid valve 206 is again energized, thereby maintaining the top brush in contact with the vehicle.

As frame 10 passes the "home" position, feeler arm 133a is temporarily deflected by tab 133b. This causes contacts 132a and 132b to temporarily open and then close. This temporary opening of contacts 132a and 132b, however, does not affect operation because contacts 124a and 170b are closed.

As the frame 10 reaches the rear end of the vehicle, top brush 32 moves downward following the contour of the vehicle. When top brush 32 reaches a certain level, TOP BRUSH DOWN switch 134 changes state, thereby opening contacts 134a and 134c, and closing contacts 134b. This de-energizes relays R2 and R3, since REAR WRAP IN switch 124 has changed state, and contacts 124a are open. With relay coils R2 and R3 de-energized, contacts 164b, 164c, 166b and 166c open and solenoid valves 200, 202, 206 and 208 are de-energized.

As the apparatus reaches the rear end of the vehicle, the rear side wrap brushes are driven inward to follow the contour of the rear end of the vehicle. As the rear side wrap brushes reach a predetermined position, the REAR IN switch 124 changes state, thereby opening contacts 124a and 124b. The opening of contacts 124b de-energizes FRONT WRAP IN solenoid valve 196, thereby causing the front side wrap brushes to retract.

When both REAR WRAP IN switch 124 and TOP BRUSH DOWN switch 134 are switched so that contacts 124a and 134a are open, coil R5 is also de-energized. This causes contacts 170a to change state, thereby de-energizing solenoid valves 174 and 176 and energizing fourth relay coil R4. Relay contacts 168a and 168b of fourth relay 168 close, thereby energizing SIDE BRUSH ROTATE FORWARD solenoid valve 198 and TRAVEL FORWARD solenoid valve 204.

As an additional safety feature, if the rear end of the track is reached without TOP BRUSH DOWN switch 134 changing states, feeler arm 133a engages tab 133c, causing HOME TRAVEL switch 132 to change state. This causes coil R5 to be de-energized, and results in the apparatus being shut down.

Frame 10 is again driven forward. The rear wrap brushes begin to separate and REAR WRAP IN switch 124 changes state. Contacts 124b again close, thereby energizing FRONT WRAP IN solenoid valve 196. The front wrap brushes are again driven into contact with the vehicle and continue in contact as the frame is driven forward to the home position. When the home position is reached, feeler arm 133a is deflected by tab 133b, thereby causing HOME TRAVEL switch 132 to change state. Contacts 132b open and opening contacts 148 (because coil R5 is already de-energized and contacts 170b are open). Power is removed from between terminals A3 and A4, which de-energizes the circuits of FIGS. 5 and 6. The operation of the apparatus is halted.

The electrical control circuitry shown in FIGS. 4, 5 and 6 is particularly advantageous, since it controls the entire operations of the apparatus during an operating cycle with a relatively small number of components. In contrast, the prior art roll-over vehicle wash apparatus typically includes a complex electrical system utilizing step controllers. The control system of the present invention is less complex, less expensive, and more easily repaired in the field.

Although the present invention has been described with reference to preferred embodiments, workers skilled in the art will recognize that changes may be made in form and detail without departing from the spirit and scope of the invention.

What is claimed is:

1. A vehicle wash apparatus comprising:
    frame means;
    front arms means pivotally connected to the frame;
    front side wrap brush means rotatably connected to the front arm means;
    rear arm means pivotally connected to the frame means;
    rear side wrap brush means rotatably connected to the rear arm means;
    actuator means for controlling the position of the front and rear arm means;
    arm position sensing means for indicating the positions of the front and rear arm means; and
    control mean responsive to the arm position sensing means for causing the actuator means to retract the rear arm means when the front arm means moves to a first predetermined position at the front end of the vehicle, and causing the actuator means to retract the front arm means when the rear arm means moves to a second predetermined position at the rear end of the vehicle.

2. The apparatus of claim 1 wherein the arm position sensing means comprises:
    first switch means having a first and second state, the first switch means having the second state when the front arm means is at the first predetermined position; and
    second switch means having a first and a second state, the second switch means having a second state when the rear arm means is at the second predetermined position.

3. The apparatus of claim 2 wherein the first predetermined position of the front arm means is a position in front of the front end of the vehicle; and wherein the second predetermined position of the rear arm means is a position to the rear of the rear end of the vehicle.

4. The apparatus of claim 3 wherein the control means comprises:
    rear arm solenoid valve means having an actuated state which causes the actuator means to drive the rear arm means inward toward the vehicle and a deactuated state which causes the actuator means to retract the rear arm means; and front arm solenoid valve means having an actuated state which causes the actuator means to drive the front arm means inward toward the vehicle and a deactuated state which causes the actuator means to retract the front arm means.

5. The apparatus of claim 4 wherein the first switch means and the rear arm solenoid valve means are in an energization circuit whereby the rear arm solenoid valve means is in its actuated state when the first switch means is in its first state, and wherein rear arm solenoid valve means is in its deactuated state when the first switch means is in its second state; and wherein the front arm solenoid valve means and the second switch means are in an energization circuit whereby the front arm solenoid valve means is in its actuated state when the second switch means is in its first state, and wherein the front arm solenoid value means is in its deactuated state when the second switch means is in its second state.

6. The apparatus of claim 1 and further comprising: track means having a front and a rear end; and wherein the frame means is movable on the track means between the front end and rear end.

7. The apparatus of claim 1 wherein the rear arm means comprise first and second rear arms connected to opposite sides of the frame means; and wherein the front arm means comprise first and second front arms connected to opposite sides of the frame means.

8. The apparatus of claim 7 wherein the rear side wrap brush means comprise first and second rear side wrap brushes rotatably connected to the first and second rear arms proximate free ends of the first and second rear arms, respectively; and wherein the front side wrap brush means comprise first and second front side wrap brushes rotatably connected to the first and second front arms proximate free ends of the first and second front arms, respectively.

9. The apparatus of claim 8 wherein the first predetermined position is a position at which the free ends of the first and second front arms are positioned proximate one another; and wherein the second predetermined position is a position at which the free ends of the first and second rear arms are positioned proximate one another.

10. A roll-over type vehicle wash apparatus comprising:
track means having a front end and a rear end;
frame means movable on the track means between the front end and the rear end;
frame drive means for moving the frame means on the track means;
front arm means pivotally connected to the frame means;
front side wrap brush means rotatably connected to the front arm means;
front brush drive means for rotating the front side wrap brush means;
rear arm means pivotally connected to the frame means;
rear side wrap brush means rotatably connected to the rear arm means;
rear brush drive means for rotating the rear side wrap brush means;
top brush support means pivotally connected to the frame means;
top brush means rotatably connected to the top brush support means;
top brush drive means rotating the top brush means;
actuator means for controlling the position of the front and rear arm means;
first switch means for sensing the position of the front arm means;
second switch means for sensing the position of the rear arm means;
third switch means for sensing position of the top brush support means;
start means for initiating the operating cycle of the apparatus;
first control means for controlling the apparatus during a first portion of an operating cycle, the first control means commencing the first portion of the cycle in response to the start means, and terminating the first portion in response to a change in state of the first switch means, the first control means causing the drive means to drive the frame means toward the front end of the track means during the first portion of the cycle and causing the front and rear brush drive means to rotate the front and rear side wrap brush means in first predetermined directions;
second control means for controlling operation of the apparatus during a second portion of an operating cycle, the second control means commencing the second portion in response to a change in state of the first switch means and ending the second period in response to changes in state of the second and third switch means, the second control means causing the drive means to drive the frame means toward the rear end of the track means, causing the top brush positioning means to drive the top brush downward into engagement with a vehicle, causing the front and rear brush drive means to rotate the front and rear side wrap brush means in second predetermined directions, and causing the top brush drive means to rotate the top brush means; and
third control means for controlling operation of the apparatus during a third portion of an operating cycle, the third control means commencing the third portion in response to changes in state of the second switch means and the third switch means, the third control means causing the drive means to drive the frame means toward the front end of the track means and causing the front and rear brush drive means to rotate the front and rear side wrap brush means in the first predetermined directions.

11. The apparatus of claim 10 and further comprising:
fourth switch means for changing state when the frame means reaches a home position; and
wherein the third control means ends the third portion of an operating cycle in response to a change in state of the fourth switch means.

12. The apparatus of claim 10 wherein the first contol means comprises a first relay having a first relay coil connected in an energization circuit with the first switch means and having first relay control contact means for controlling operation of the drive means and the front and rear brush drive means.

13. The apparatus of claim 12 wherein the first relay coil is connected in an initial energization circuit with the start means, and wherein the first relay further includes first holding contact means controlled by the first relay coil to maintain the first relay coil in an energized state after initial energization.

14. The apparatus of claim 12 wherein the second control means comprises a second relay having a second relay coil connected in an energization circuit with the second and third switch means and having second relay control contact means for controlling the drive means and the front and rear brush drive means; and a third relay having a third relay coil connected in an energization circuit with the second and third switch means and having third relay control contact means for controlling the top brush drive means.

15. The apparatus of claim 14 and further comprising: top brush positioning actuator means for controlling the position of the top brush support means.

16. The apparatus of claim 15 wherein the third relay control contact means further control the top brush positioning actuator means.

17. The apparatus of claim 14 wherein the second relay coil is connected in an initial energization circuit with the first switch means, and wherein the second relay includes holding contact means controlled by the second relay coil to maintain the second relay coil in an energized state after initial energization.

18. The apparatus of claim 14 wherein the third control means comprises fourth relay means having a fourth relay coil and fourth relay control contact means for controlling operation of the drive means and the front and rear brush drive means.

19. The apparatus of claim 18 and further comprising: a fifth relay having a fifth relay coil connected in an energization circuitry with second switch means and with the third and fourth switch means, and having fifth relay control contact means for controlling energization of the fourth relay coil.

20. The apparatus of claim 19 and further comprising: detergent supply means for spraying detergent onto the vehicle; and wherein the fifth relay control contact means control operation of the detergent supply means.

21. The apparatus of claim 10 wherein the first switch means changes from a first to a second state when the front arm means attains a first predetermined position in front of the front end of the vehicle, and wherein the second switch means switches from a first to a second state when the rear arm means attains a second predetermined position to the rear of the rear end of the vehicle.

22. The apparatus of claim 21 and further comprising:
rear arm solenoid valve means having an actuated state which causes the actuator means to drive the rear arm means inward toward the vehicle and a deactuated state which causes the actuator means to retract the rear arm means; and front arm solenoid valve means having an actuated state which causes the actuator means to drive the front arm means inward toward the vehicle and a deactuated state which causes the actuator means to retract the front arm means.

23. The apparatus of claim 22 wherein the first switch means and the rear arm solenoid valve means are in an energization circuit whereby the rear arm solenoid valve means is in its actuated state when the first switch means is in its first state, and wherein the rear arm solenoid valve means is in its deactuated state when the first switch means is in its second state; and wherein the front arm solenoid valve means and the second switch means are in an energization circuit whereby the front arm solenoid valve means is in its actuated state when the second switch means is in its first state, and wherein the front arm solenoid valve means is in its deactuated state when the second switch means is in its second state.

24. The apparatus of claim 21 wherein the rear arm means comprise first and second rear arms connected to opposite sides of the frame means, and wherein the front arm means comprise first and second front arms connected to opposite sides of the frame means.

25. The apparatus of claim 24 wherein the rear side wrap brush means comprise first and second rear side wrap brushes rotatably connected to the first and second rear arms proximate the free ends of the first and second rear arms, respectively; and wherein the front side wrap brush means comprise first and second front side wrap brushes rotatably connected to the first and second front arms proximate the free ends of the first and second front arms, respectively.

26. The apparatus of claim 25 wherein the first predetermined position is a position at which the free ends of the first and second front arms are positioned proximate one another; and wherein the second predetermined position is a position at which the free ends of the first and second rear arms are positioned proximate one another.

* * * * *